United States Patent
Spies et al.

(10) Patent No.: US 7,363,746 B2
(45) Date of Patent: Apr. 29, 2008

(54) METHOD FOR EXTERMINATING AN ANT COLONY

(75) Inventors: Rodney Spies, Goldthwaite, TX (US); Alan Abele, Marblehead, OH (US); Sydney Brooks, Mullin, TX (US)

(73) Assignee: Mills County Technologies, Inc., Goldthwaite, TX (US)

( * ) Notice: Subject to any disclaimer, the term of this patent is extended or adjusted under 35 U.S.C. 154(b) by 0 days.

(21) Appl. No.: 11/458,010

(22) Filed: Jul. 17, 2006

(65) Prior Publication Data
US 2006/0248784 A1    Nov. 9, 2006

Related U.S. Application Data

(60) Division of application No. 10/753,963, filed on Jan. 8, 2004, now Pat. No. 7,076,915, which is a continuation-in-part of application No. 10/236,445, filed on Sep. 5, 2002, now abandoned.

(60) Provisional application No. 60/317,075, filed on Sep. 5, 2001.

(51) Int. Cl.
*A01M 1/02* (2006.01)
*H05B 6/80* (2006.01)

(52) U.S. Cl. ............... 43/132.1; 43/98; 43/112; 43/124

(58) Field of Classification Search ............ 43/112, 43/124, 132.1, 138, 144, 98, 111
See application file for complete search history.

(56) References Cited

U.S. PATENT DOCUMENTS

| | | | |
|---|---|---|---|
| 2,307,163 A | 1/1943 | Shea | |
| 3,377,942 A | 4/1968 | Carbon | |
| 3,696,734 A | 10/1972 | Beasley et al. | |
| 4,370,534 A | 1/1983 | Brandon | |
| 4,637,161 A | 1/1987 | Turner | |
| 4,756,118 A | 7/1988 | Evans | |
| 4,768,306 A | 9/1988 | Hilbun | |
| 4,817,329 A | 4/1989 | Forbes | |
| 4,833,818 A | 5/1989 | Berta | |
| 4,914,854 A | 4/1990 | Zhou et al. | |
| 4,953,320 A * | 9/1990 | Nelson | 43/121 |
| 4,958,456 A | 9/1990 | Chaudoin et al. | |
| 4,961,283 A | 10/1990 | Forbes | |
| 5,099,598 A * | 3/1992 | Carter | 43/132.1 |
| 5,154,018 A | 10/1992 | Livingston | |
| 5,241,779 A | 9/1993 | Lee | |
| 5,280,684 A | 1/1994 | Filonczuk | |

(Continued)

*Primary Examiner*—Darren W. Ark
*Assistant Examiner*—John Davis Holman
(74) *Attorney, Agent, or Firm*—Smith, Gambrell & Russell LLP

(57) ABSTRACT

An ant exterminating apparatus operates to exterminate an ant colony using a energy producing element secured within a housing. The ant exterminating apparatus further includes a cover that is pivotally attached to a base. The cover is pivotable between an open position and a closed position, and an energy producing element is affixed to the cover to quickly generate radiation or heat energy between the cover and the base upon command of either the user or a conventional timing device. Bait is placed within the housing to attract the worker ants, and the energy producing element is activated periodically. The energy producing element will raise the body temperature of the ants such that the ants will die while feeding on the bait or soon thereafter, thereby destroying the colony.

3 Claims, 4 Drawing Sheets

U.S. PATENT DOCUMENTS

| | | |
|---|---|---|
| 5,394,643 A | 3/1995 | Schmittmann |
| 5,471,782 A * | 12/1995 | Brittell ........................ 43/121 |
| 5,561,942 A | 10/1996 | Mugno |
| 5,632,115 A | 5/1997 | Heitman |
| 5,718,078 A | 2/1998 | Therrien |
| 5,732,503 A | 3/1998 | Cheng |
| 5,870,852 A | 2/1999 | Stanley |
| 5,968,401 A * | 10/1999 | Roy ........................... 219/690 |
| 6,009,662 A * | 1/2000 | Chang ........................ 43/112 |
| 6,026,609 A | 2/2000 | Rawls |
| 6,310,329 B1 | 10/2001 | Carter |
| 6,581,324 B1 | 6/2003 | Creeger et al. |
| 6,588,140 B1 | 7/2003 | Johnson et al. |
| 6,594,945 B1 | 7/2003 | Fu |
| 6,604,318 B1 | 8/2003 | Cassidy |
| 6,609,330 B1 | 8/2003 | Heitman |
| 6,612,067 B2 | 9/2003 | Topp |

* cited by examiner

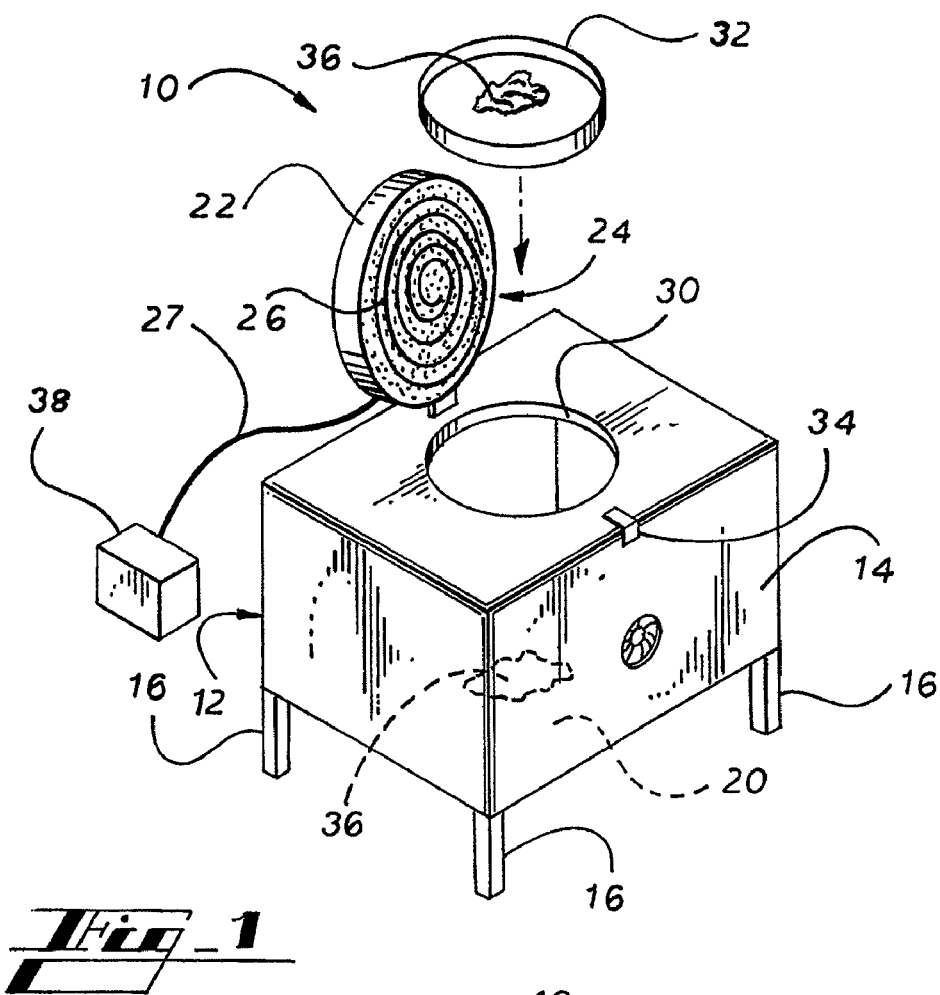
Fig_1
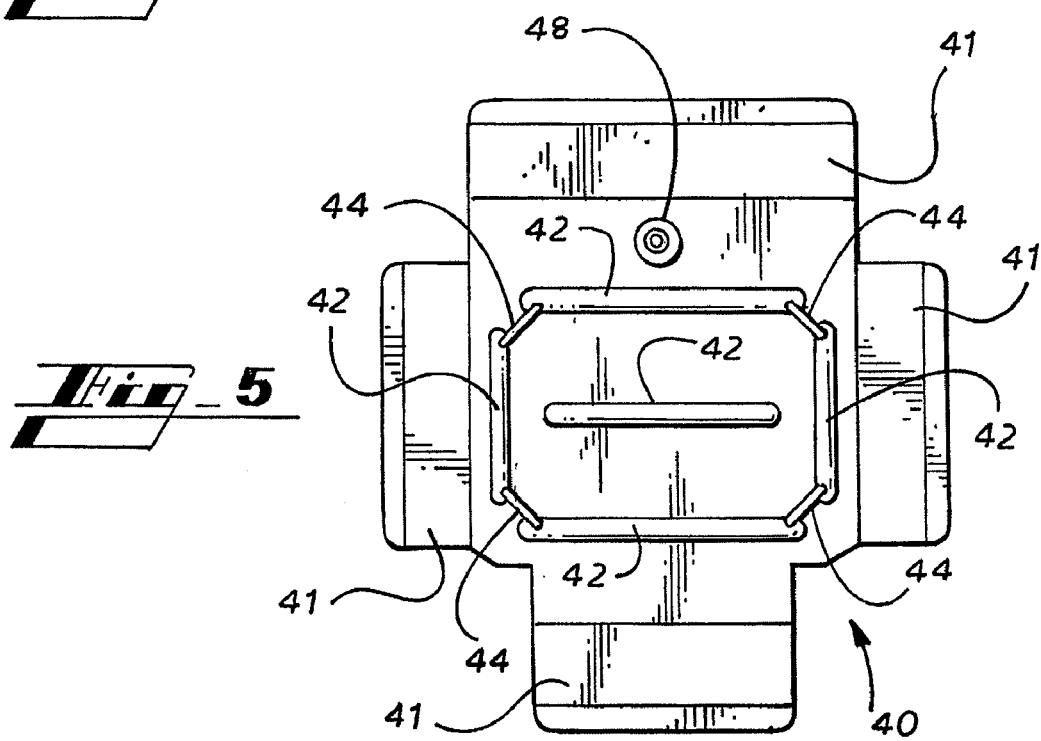
Fig_5

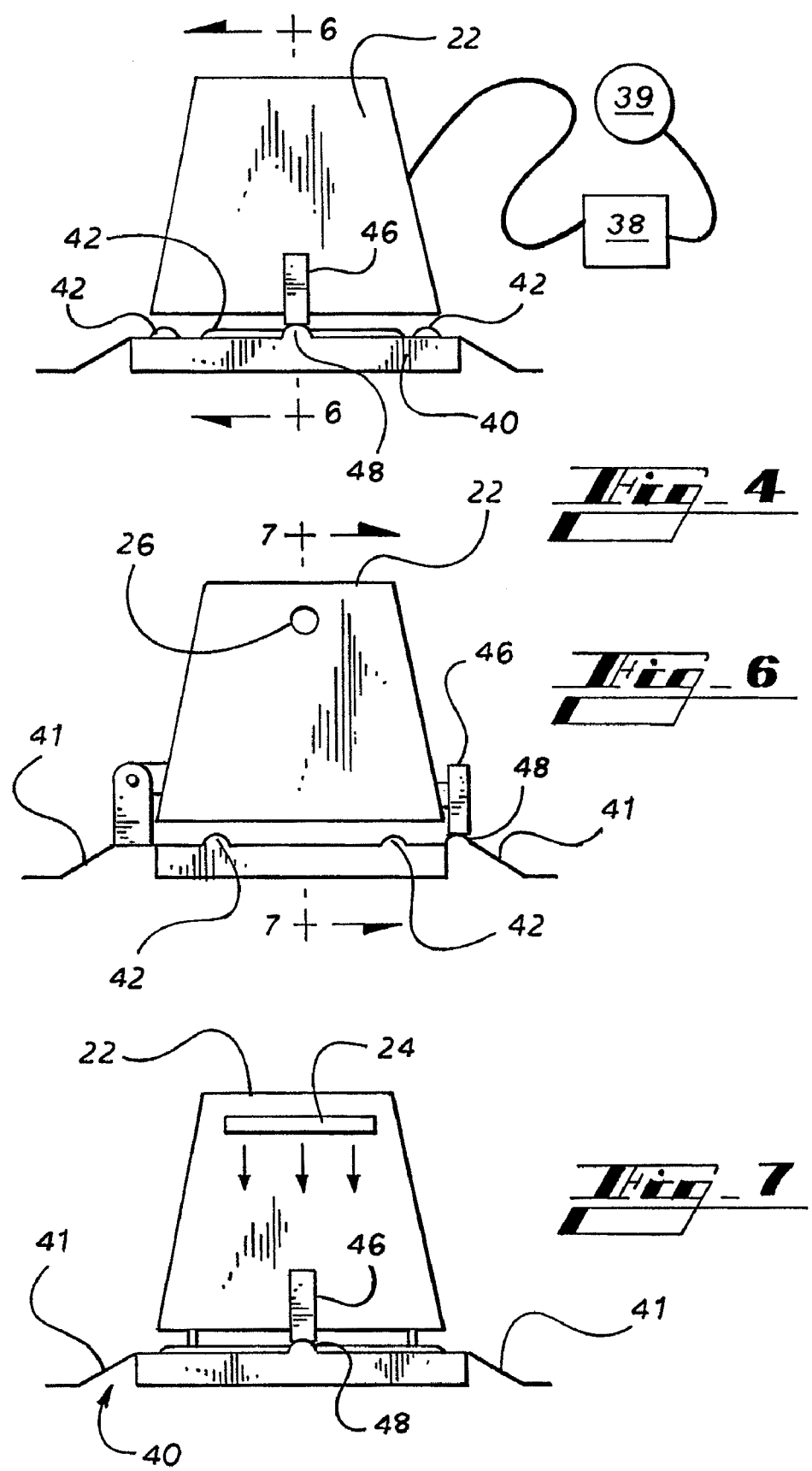

METHOD FOR EXTERMINATING AN ANT COLONY

CLAIM OF PRIORITY

The present patent application is a divisional patent application filed under 37 C.F.R. 1.53(b), claiming benefit from co-pending patent application Ser. No. 10/753,963, filed on Jan. 8, 2004, now U.S. Pat. No. 7,076,915 which was a continuation-in-part of patent application Ser. No. 10/236,445, filed on Sep. 5, 2002, now abandoned, which further claims priority from Provisional Application No. 60/317,075, filed on Sep. 5, 2001, each of which are incorporated herein by reference.

FIELD OF THE INVENTION

The present invention relates to an apparatus for attracting and disabling ants and other insects, and a method for using such an apparatus. More particularly, the present invention relates to an apparatus and use of such apparatus for attracting and disabling worker ants in a housing through the timed production of heat and radiation such that the ant colony is starved and thereby destroyed.

BACKGROUND OF THE INVENTION

Ants and similar insects are often considered to be common nuisances to people and animals alike. They live in a social organization wherein a series of castes of ants independently work on a specific job to maintain the existence of the colony. In particular, a colony of ants typically includes three castes: winged, fertile females, or queens; wingless, infertile females, or workers; and winged males. Those ants ordinarily seen on ground around ant hills are the worker ants. Whenever a generation of queens and males matures, the ants will mate, with the males dying shortly afterward, and each fecundated queen establishing a new colony. The queen will excavate a chamber within the mound, and proceed to lay eggs for the rest of her life (up to fifteen years), fertilizing most of them with stored sperm.

As a result of their colony structure, ants are typically considered an aesthetic nuisance. In particular, ant colonies can nest in a system of tunnels in soil that are typically under a dome or hill of excavated earth, sand, or other debris. Most of these ants are mound-building, and they may construct hills above their tunnels that my have a height of up to five feet and a base that is even wider. Other species nest in cavities in dead wood, in living plant tissue, or in papery nests attached to twigs or rocks. These colonies of ants can range in size from a few dozen to half a million or more individuals. These large colonies of ants create an unpleasant aesthetic appearance in lawns, parks, and general earthen areas, especially with the hills that are produced by these ants.

In addition to aesthetic annoyances, ants can also create physical problems in their surrounding environment. For example, the ant habitats that include domes and hills can cause devastation to the grass and foliage under and near the territory occupied by the ants. In addition to damage to land, certain ants, such as fire ants, are also known to be a physical annoyance to people and animals. More specifically, fire ants are able to hurt people and animals by injecting a venom which can cause a painful burning sensation.

In response to the problems encountered by ants and related insects, several devices and methods have been designed to destroy fire ant colonies. One common method is the use of pesticides that are scattered amongst the colony to kill the ants. While effective in killing ants, such pesticides often also have undesirable secondary effects, such as harming surrounding vegetation of the environment and even harming people and animals near the area containing the pesticide. Consequently, other mechanical designs have also been conceived to entrap and kill ants. One such example is U.S. Pat. No. 5,718,078, which issued on Feb. 17, 1998 to Gerrard Therrien. This patent discloses a device that is used to attract ants into an area proximate a container and then entrap the ants in the container. To attract the ants, the inventor deposits a sticky composition such as molasses or gear oil, such that the ants will be attracted to the top surface of the container. An actuator assembly thereby vibrates the container, such that the ants are momentarily trapped in the container. However, a problem with such a design is that the ants can potentially escape the container if the user does not restrict the container opening within a certain period of time. Furthermore, the ants that escape remain the same healthy condition as when they entered the container.

Consequently, the prior art has failed to disclose a manner for disabling ants and thereby starving the colony that is both safe and effective.

SUMMARY OF THE INVENTION

The present invention satisfies the above-described needs with an ant exterminating apparatus for effectively removing an ant colony at the mound or nest without the dangers provided by insecticides. The ant exterminating apparatus of the present invention includes a housing that is to be placed near the ant colony to be removed. The housing includes a side wall that is supported by a series of legs, such that the housing may be placed within a sufficient proximity of an ant colony. The housing may additionally include an upper surface and a bottom surface as desired by the user.

The ant exterminating apparatus further includes a cover that is pivotally attached to the uppermost surface of the side wall. The cover is able to pivot between an open position and a closed position. A heat or radiation producing element is affixed to the cover to quickly generate energy, such as heat, light or other radiation, within the housing upon command of either the user or a conventional timing device. Preferably, bait is placed proximate the housing to attract the worker ants, and the energy producing element is activated periodically. The energy producing element will raise the body temperature of the worker ants to such a degree that the worker ants will die while feeding on the bait or soon thereafter, thereby eliminating the food source for the ant colony, and consequently destroying the colony. A timer is additionally included in the apparatus for controlling the operation of the energy producing element.

BRIEF DESCRIPTION OF THE DRAWINGS

An apparatus embodying the features of the present invention is depicted in the accompanying drawings, which form a portion of this disclosure, wherein:

FIG. 1 is a perspective view of an apparatus for exterminating an ant colony in accordance with one embodiment of the present invention;

FIG. 4 is a front elevational view of an apparatus for exterminating an ant colony in accordance with a second embodiment of the present invention;

FIG. 5 is a top plan view of the base of the apparatus for exterminating an ant colony illustrated in FIG. 2;

FIG. 6 is a sectional side elevational view of the apparatus for exterminating an ant colony taken along lines 6-6 in FIG. 2;

FIG. 7 is a sectional front elevational view of the apparatus for exterminating an ant colony taken along lines 7-7 in FIG. 6.

DETAILED DESCRIPTION OF THE PREFERRED EMBODIMENT

Figure 2:
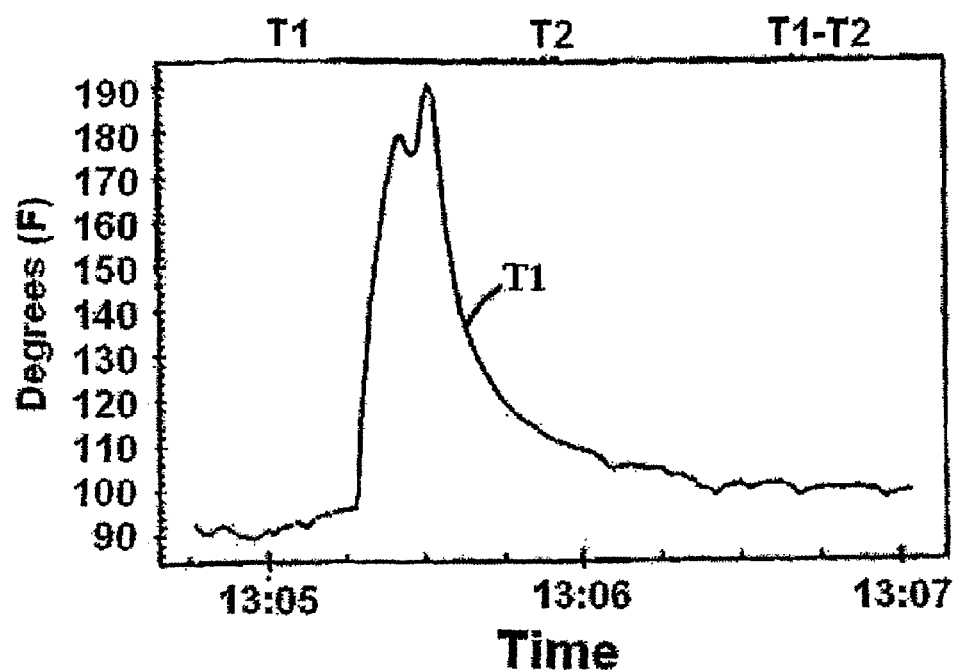
FIG. 2 is a diagram illustrating the rise in temperature of an ant in the ant exterminating apparatus of the present invention.

Looking now to FIG. 1, the ant exterminating apparatus 10 of the present invention is illustrated. This ant exterminating apparatus 10 includes a housing 12 or frame that is made of a fireproof material. The housing 12 of one embodiment includes a side wall 14 that surrounds a vacant area. The side wall 14 could be made of one continuous surface, or it may include any number of separate walls that are able to substantially surround a void area. The side wall 14 of the housing 12 is preferably supported above a ground surface by a series of legs 16. In addition to the side wall 14, the ant exterminating apparatus 10 may include an upper surface 18 connected to the upper edge of the side wall 14 and a lower surface 20 may be connected to the lower edge of the side wall 14.

Moreover, the ant exterminating apparatus 10 additionally includes a cover 22 that is pivotally attached to the uppermost surface of the side wall 14. The cover 22 is able to pivot between a closed position, wherein the cover 22 is substantially perpendicular to the side wall 14, and an open position, wherein the cover 22 is not perpendicular to the side wall 14. Moreover, the ant exterminating apparatus 10 also includes an energy producing element 24. The energy producing element 24 is preferably affixed to the cover 22, although it may be attached to another surface of the ant exterminating apparatus 10, such as the side wall 14 or the upper surface 18, if desired. The energy producing element 24 is designed to quickly generate heat, light or other radiation upon command of either the user or a timer 38.

In the embodiment illustrated in FIG. 1, the energy producing element 24 is attached to the cover 22 that is pivotally connected to the uppermost surface of the side wall 14. Moreover, the energy producing element 24 of the design illustrated in FIG. 1 includes a conductive heating coil 26 or other element that may be connected to any number of power sources. Such power sources may include a conventional battery (not illustrated) or a conventional electrical outlet, in which case a standard power cord may be used to connect the energy producing element 24 with the power source. It should further be noted that the energy producing element 24 can include any number of means for generating the desired radiation and heat that is necessary to kill the insects in addition to the conductive heat coil 26 illustrated in FIG. 1. For example, it is within the scope of the invention to include an infrared heating element or high intensity light source to raise the temperature of the ant body rather than a heating coil.

In the embodiment as illustrated in FIG. 1, the upper surface 18 is attached to the side wall 14 along the uppermost edge of the side wall 14, while the bottom surface 16 is attached to the lowermost edge of the side wall 14 opposite the upper surface 18. An aperture 30 traverses the upper surface 18, with the size of the aperture 30 corresponding to the size of the cover 22. A removable or detachable pan 32 or plate may be included in the present embodiment, with the pan 32 positioned within the aperture 18, the purpose of which will be discussed herein. In this embodiment, the cover 22 will pivot to overlap aperture 18 when the cover 22 is in the closed position. A locking mechanism 34 on one side of the cover 22 can be secured with a lock (not illustrated) for safety, and the cover 22 may additionally include a handle (not illustrated) on the top for transporting the ant exterminating apparatus 10. More specifically, the locking mechanism 34 will lock the cover 22 to the top surface of the housing 12 so that the energy producing element 24 is not exposed to persons proximate the ant exterminating apparatus 10 and also to allow the user to carry the ant exterminating apparatus 10 safely and securely with the handle.

Figure 8:
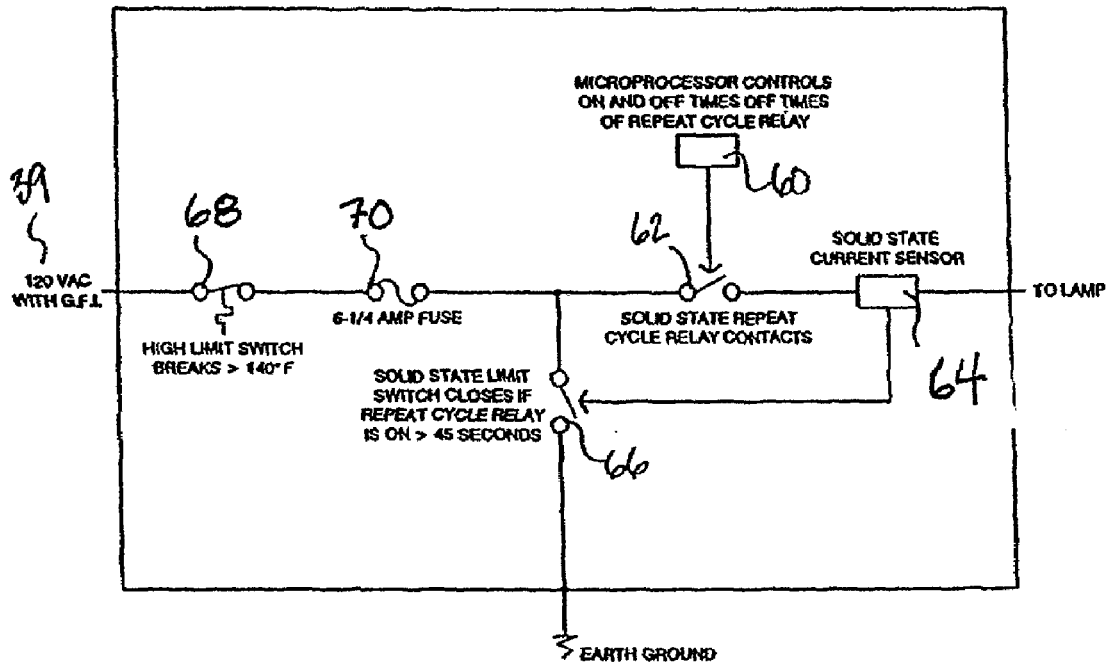
FIG. 8 is a block diagram of the timer used in the present invention.

The energy producing element 24 is attached to the hinged cover 22. In FIG. 1, the energy producing element 24 takes the form of heating coils 26 which radiate from the center of the cover 22 and extend to the edge of the pan 20 when closed. The heating coils 26 are connected to the power source via a timer 38, such that the timer 38 will activate the coils 26 at programmed intervals as desired by the user. More specifically, FIG. 8 illustrates one embodiment of the timer 38 as used in the present ant exterminating apparatus 10. The timer 38 is connected between the heating coils 26 and a conventional power source, such as a battery or other power source. This may be the same power source that provides power to the heating coils 26, or it may be an independent power source.

A further embodiment of the present invention is illustrated in FIGS. 4-7. In this embodiment, the ant exterminating apparatus 10 includes a base plate 40 that has four legs 41 attached thereto. The legs 41 provide stability for the base plate 40 on a ground surface, and they further provide a bridge for ants to cross to reach the base plate 40. The base plate 40 includes a series of raised ribs 42 that act as heat sinks to absorb and dissipate any excess heat generated by the energy producing element 24. The bait is preferably placed between the raised ribs 42. Furthermore, a series of apertures 44 traverse the base plate 40 at various locations, and the apertures 44 act as water drain slots to remove any undesired rainwater or similar liquid from the base plate 40.

The cover 22 is pivotally attached to the base plate 40, such that the cover 22 may be pivoted between a position substantially parallel to the base plate 40 and a position substantially orthogonal to the base plate 40. A handle 46 is mounted to the cover 22, and a base protrusion 48 is positioned on the base plate 40 proximate the handle 46. The handle 46 will engage the base protrusion 48 such that the base protrusion 48 will prevent the cover 22 from engaging the base plate 40. Furthermore, the base protrusion 48 will assist in providing a gap between the cover 22 and the base plate 40 that allows ants to enter the area below the cover 22. The energy producing element 24, such as a halogen lamp or heating element, is attached to the cover 22. The energy producing element 24 is in electrical connection with the timer 38, which is further connected to a power source 39.

The timer 38 used in the embodiments described above includes a series of components to regulate the operation of the energy producing element 24. Specifically, the timer 38 includes a microprocessor 60 that is connected to a repeat cycle relay 62, with the repeat cycle relay 62 controlling when the power source is connected to the energy producing element 24. Thus, the microprocessor 60 controls the On and Off times of the repeat cycle relay 62 to control when the energy producing element 24 operates. In addition, a solid state current sensor 64 is connected between the repeat cycle relay 62 and the energy producing element 24. The current sensor 64 is additionally connected to a primary safety switch 66. The current sensor 64 monitors the duration that the repeat cycle relay 62 is ON, and will activate the primary safety switch 66 if the repeat cycle relay 62 is ON over a set period of time, preferably 45 seconds. As a result, the primary safety switch 66 will disable the energy producing element 24 until the timer 38 is reset by the operator.

The timer 38 additionally includes a temperature safety switch 68 that is connected between the power source and the repeat cycle relay 62. The temperature safety switch 68 may be a high limit switch with a set predetermined temperature threshold, such as 140 degrees Fahrenheit. Therefore, if the temperature of the area surrounding the temperature safety switch 68 exceeds this limit, the temperature safety switch 68 will open, thereby disconnecting the heating coils 26 from the power source. As a result, the timer 38 measures not only the time in which the energy producing element 24 are activated, but also the temperature generated by the energy producing element 24. This therefore provides a precautionary measure both in limiting the duration that the heating coils operate and also in the heat produced by the associated energy producing element 24. Furthermore, a fuse 70 is provided between the temperature safety switch 68 and the repeat cycle relay 62, with the fuse 70 acting as a circuit protector from potential dangerous current levels.

In addition to the safety mechanisms provided with the timer 38, a position safety switch (not illustrated) may be included in the cover 22. The position safety switch is used to deactivate the energy producing element 24 when the cover 22 is lifted or is ajar from the top surface of the base plate 40 or the housing 12.

The preferred manner of attracting ants to the ant exterminating apparatus is to use bait 36 that is placed on the base plate 40 or within the housing 12. In the embodiment as illustrated in FIG. 1, the bait 36 is positioned on either the pan 32 held by the upper surface 18 or on the lower surface 20. However, it is important to note that the bait 36 could be positioned at any point on the base plate 40 or within the housing 12, as long as the base plate 40 or housing 12 will allow the ants to traverse the base plate 40 or the housing 12 in their quest for the bait 36. The bait 36 used in the present invention can be any one of many items that appeal to ants. In a common application, conventional household foodstuffs that appeals to ants may be easily used, such as animal food, rice, or sugar. It should also be noted that other means of attracting ants may be incorporated into the present design, such as a vibrating mechanism or another insect attractant known in the art.

In operation, the ant exterminating apparatus 10 will eliminate ants as follows. The user will place the ant exterminating apparatus 10 proximate a colony of fire ants. The worker ants will then be attracted to the bait 36 in the housing 12 as a food source for the colony. As a result, the worker ants will leave the colony and enter the housing 12 through any means available, such as through the aperture 30 in the upper surface 18 of the housing 12, up the legs 16 of the housing 12, or through any other gap in the housing 12 that is available to the worker ants. As a result of the ants entry into the housing 12, they will be proximate the energy producing element 24, which is activated periodically using the timer 38. As stated above, the timer 38 can be On for 45 seconds, but is desirably turned off at various increments for the safety of the user and the maintenance of the device.

When the timer 38 activates the energy producing element 24, the energy producing element 24 will raise the body temperature of the worker ants to such a degree that the worker ants will die while feeding on the bait 36 or soon thereafter. Worker ants escaping from the housing 12 will be killed either from the injury that they suffer from their proximity with the energy producing element 24 or from a direct encounter with the energy producing element 24.

Consequently, since the worker ants die before being able to return to their colony, the colony itself, including the queen, will starve. It is important to note that the ant exterminating apparatus 10 does not act as a trap, and it does not kill the queen of the colony. Rather, the ant exterminating apparatus 10 only operates to kill the worker ants. As a result, the queen and the larva must relocate or perish without sufficient food from the worker ants. Thus, the ant exterminating apparatus 10 is able to provide a safe and poison free means for eradicating undesirable ants within a given vicinity.

Figure 3:
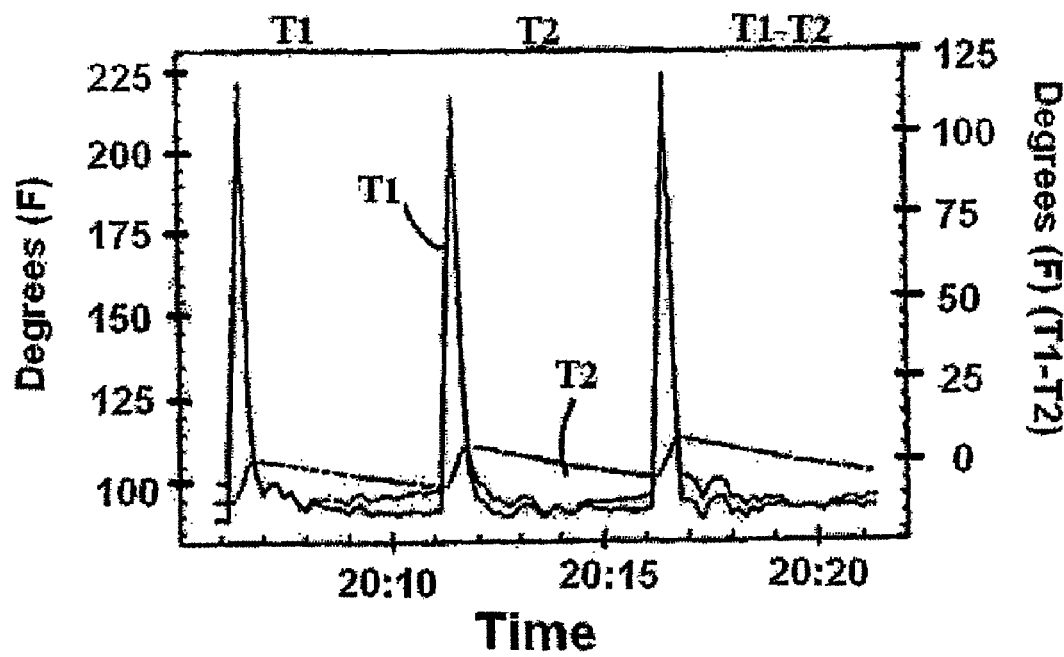
FIG. 3 is a diagram illustrating the rise in temperature of an ant and bait in the ant exterminating apparatus of the present invention.

Looking to FIGS. 2 and 3, testing results are provided demonstrating the use of the energy producing element 24 to effectively raise the body temperature of an ant. In each graph, T-1 represents a single thermocouple that is tested, with the thermocouple having a mass similar to one ant body. The thermocouple is placed approximately five inches from the energy producing element 24, and it is shown that the temperature will rise from 90° F. to 190° F. in approximately twelve seconds. Thereafter, the body experiences a dip due to water being converted into vapor, thus absorbing a large unit of the infrared energy. At that point, the ant will die. FIG. 3 is a further illustration of this point, with T-2 representing a second thermocouple that corresponds with the bait temperature. It is clear from this chart that the bait temperature T-2 does not rise as the ant body temperature T-1. As a result, the bait may continue to attract ants to the base plate 40 or to enter the housing 12.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for exterminating a group of insects comprising the steps of:
   a) positioning a base member proximate the insects for access by the insects and pivotally moving an infrared energy source between a position proximate said base member and distant from said base member using a cover;
   b) luring insects to said base member using an attractant;
   c) generating infrared energy using said infrared energy source positioned proximate said base member to injure the insects as the insects traverse said base member;
   d) cyclically energizing said infrared energy source;
   e) monitoring an apparatus temperature with a safety switch in electrical connection with said infrared energy source; and
   f) disconnecting said infrared energy source from a power source if the temperature proximate base member exceeds a predetermined level.

2. The method as described in claim 1, wherein step e) further comprises the step of:
   setting said safety switch to a predetermined temperature threshold.

3. The method as described in claim 1 wherein step e) further comprises the step of:
   monitoring the duration of operation of said infrared energy source with said safety switch; and
   disconnecting said infrared energy source from a power supply using said safety switch after a predetermined period of time.

* * * * *